(12) United States Patent
Narin et al.

(10) Patent No.: US 8,381,044 B2
(45) Date of Patent: *Feb. 19, 2013

(54) SYSTEMS AND METHODS FOR NETWORK INFORMATION COLLECTION

(75) Inventors: Dogu Narin, Sunnyvale, CA (US); Siobhan Tully, Windham, NH (US); Mark Lussier, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/308,176

(22) Filed: Nov. 30, 2011

(65) Prior Publication Data

US 2012/0072764 A1    Mar. 22, 2012

Related U.S. Application Data

(63) Continuation of application No. 12/241,325, filed on Sep. 30, 2008, now Pat. No. 8,086,907.

(51) Int. Cl.
*G06F 11/00* (2006.01)
(52) U.S. Cl. .............. 714/48; 714/26; 709/224
(58) Field of Classification Search .......... None
See application file for complete search history.

(56) References Cited

U.S. PATENT DOCUMENTS

| | | | |
|---|---|---|---|
| 5,473,599 A | 12/1995 | Li et al. | |
| 6,005,920 A | 12/1999 | Fuller et al. | |
| 6,219,648 B1 | 4/2001 | Jones et al. | |
| 6,430,712 B2 | 8/2002 | Lewis | |
| 7,082,554 B2 | 7/2006 | Wilson et al. | |
| 7,111,206 B1 | 9/2006 | Shafer et al. | |
| 7,120,819 B1 * | 10/2006 | Gurer et al. | 714/4.2 |
| 7,213,179 B2 | 5/2007 | Song et al | |
| 7,257,744 B2 | 8/2007 | Sabet et al. | |
| 7,568,133 B1 | 7/2009 | Bette et al. | |

OTHER PUBLICATIONS

Co-pending U.S. Appl. No. 12/241,325, filed Sep. 30, 2008 entitled "System and Methods for Network Information Collection" by Narin et al., 49 pages.

* cited by examiner

*Primary Examiner* — Yolanda L Wilson
(74) *Attorney, Agent, or Firm* — Harrity & Harrity, LLP

(57) ABSTRACT

A network device may include logic configured to receive a problem report from a second network device, store and analyze data included in the problem report, filter data in the problem report to determine when the problem report is to be transmitted to a third network device, and transmit the problem report to the third network device when the filtering determines that the problem report is to be transmitted.

20 Claims, 13 Drawing Sheets

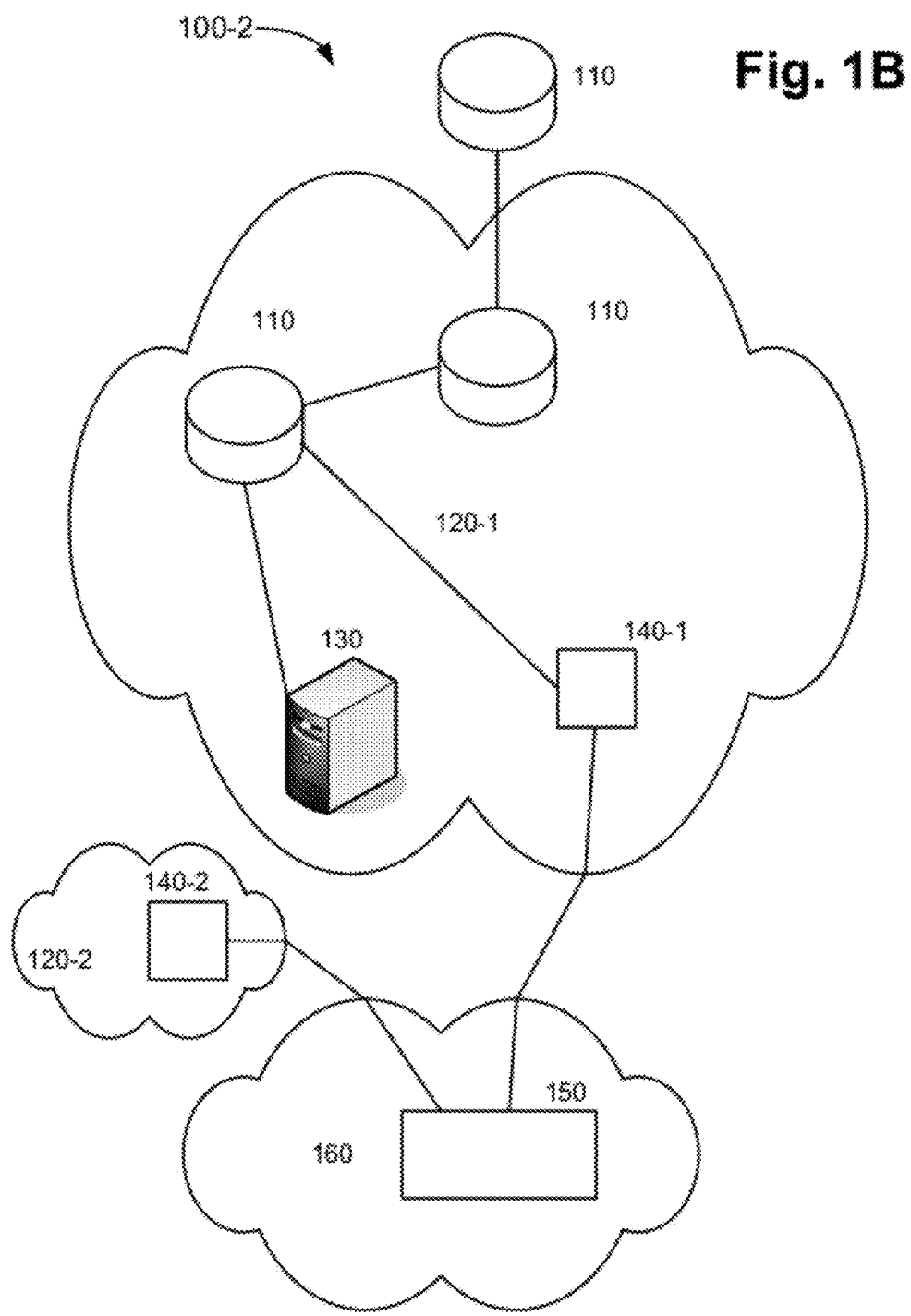

SYSTEMS AND METHODS FOR NETWORK INFORMATION COLLECTION

RELATED APPLICATION

This application is a continuation of U.S. patent application Ser. No. 12/241,325, filed on Sep. 30, 2008, the disclosure of which is incorporated by reference herein.

BACKGROUND INFORMATION

Event detection and management systems typically store conditions that, when satisfied, generate error messages within a network device. The error messages, such as an alert indicating a possible error, may be sent as a message to a remote location. In most cases, the error messages sent by existing systems do not provide adequate information or procedures relating to how to fix errors within the network device. Further, network operators that receive the error messages at remote locations commonly do not have adequate knowledge of processes within network devices. Thus, network operators may be alerted to errors, but the network devices may remain in failed states as network operators can not reconfigure the network devices to correct the errors.

SUMMARY

According to one aspect, a network device may include logic configured to receive a problem report from a second network device; store and analyze data included in the problem report; filter data in the problem report to determine when the problem report is to be transmitted to a third network device; and transmitting the problem report to the third network device when the filtering determines that the problem report is to be transmitted.

According to another aspect, a method may include receiving a problem report from a first network device; analyzing data included in the problem report; filtering data in the problem report to determine when the problem report is to be transmitted to a second network device; and transmitting the problem report to the second network device when the filtering determines that the problem report is to be transmitted.

According to yet another aspect, a network device may include logic configured to receive a problem report from a second network device; create a problem ticket based on the problem report; store and analyze data included in the problem report; determine reconfiguration information based on the analyzed data; and allow the second network device to obtain the determined reconfiguration information when the second network device polls the network device.

According to still another aspect, a method may include receiving a first problem report from a first network device; receiving a second problem report from a second network device; storing and analyzing data included in the first and second problem reports; determining reconfiguration information based on the stored and analyzed data included in the first and second problem reports; and allowing at least one of the first or second network devices to obtain the determined reconfiguration information.

BRIEF DESCRIPTION OF THE DRAWINGS

FIGS. 1A-1C show exemplary network configurations in which concepts described herein may be implemented;

DETAILED DESCRIPTION OF PREFERRED EMBODIMENTS

The following detailed description refers to the accompanying drawings. The same reference numbers in different drawings may identify the same or similar elements.

Embodiments described herein may allow errors and/or events within network devices or elements to be detected, bundled with data in an XML event problem report bundle, and/or transmitted upstream to an information collection gateway. The information collection gateway may filter data in the received XML event problem report bundle, and/or may determine if the XML event problem report bundle should be further transmitted to a backend network device for further processing. The backend network device may further process event and/or error data in order to create reconfiguration information to correct the event and/or error that occurred in a network element. The reconfiguration information may be obtained from the backend network device by the information collection gateway, and may be transmitted from the information collection gateway to the network element.

While some of the following description is provided mainly in the context of routers or other network devices or elements at layer 2 and/or layer 3 of the Open Systems Interconnection (OSI) Model, the principles and teachings may be applied to different types of network devices at different layers of communication (e.g., Multi-protocol label switching (MPLS) routers, a Synchronous Optical Network (SONET) add-drop multiplexers, a Gigabit Passive Optical network (GPONs) switches, a Synchronous Digital Hierarchy (SDH) network elements, etc.).

Figure 1A:
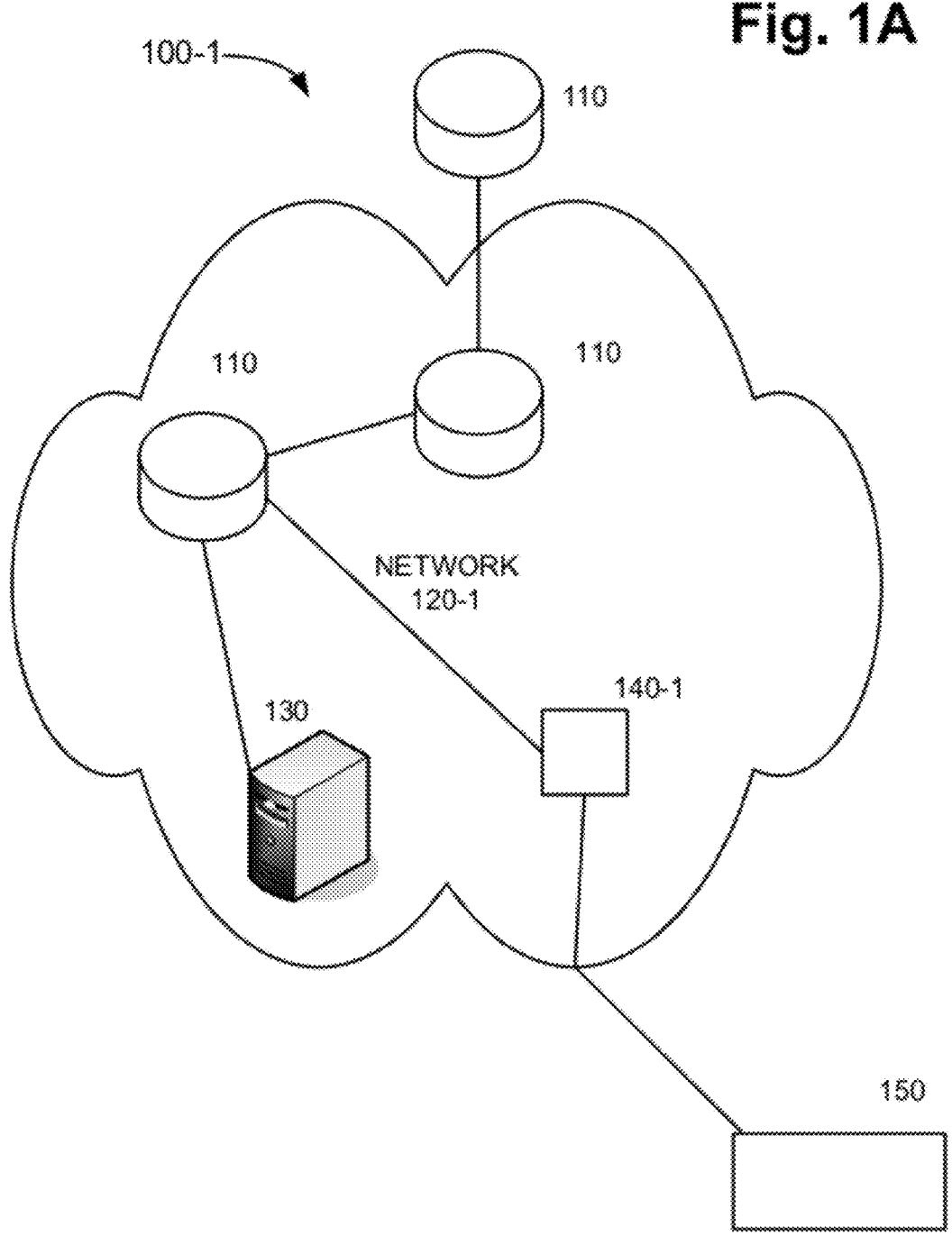
Figure 1C:
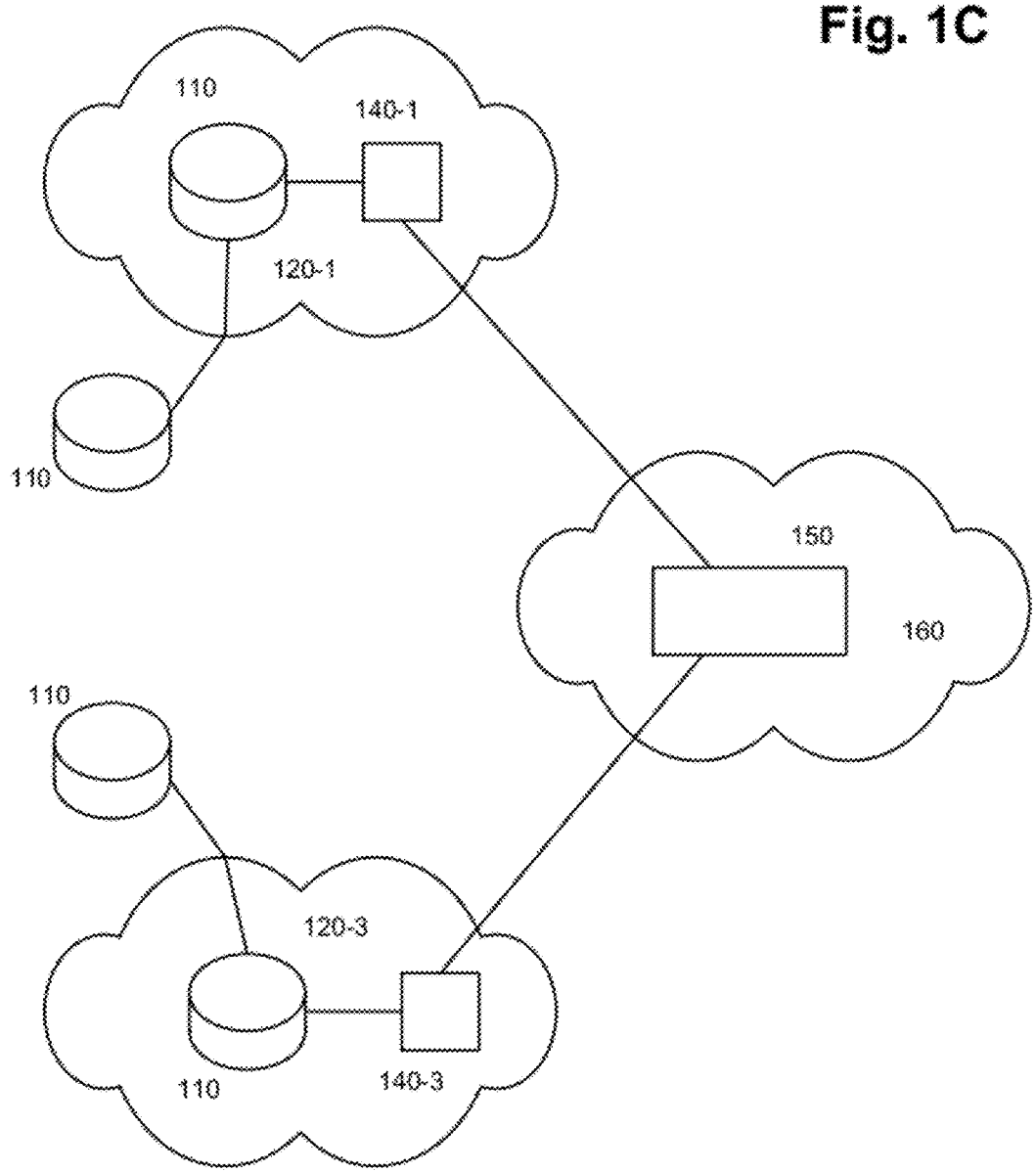

FIGS. 1A-1C depict exemplary network configurations in which concepts described herein may be implemented. As shown in FIG. 1A, a network 100-1 may include a number of network elements 110, a network 120-1, a server 130, an information collection gateway 140-1 and/or a backend network device 150. In practice, network 100-1 may include fewer, different, or additional elements than those illustrated in FIG. 1A.

Network elements 110 may include devices for performing network-related functions. For example, each of network elements 110 may include a router, a switch (e.g., a provider edge (PE) router in a MPLS network), etc.

Network 120-1 may include the Internet, an ad hoc network, a local area network (LAN), a wide area network (WAN), a metropolitan area network (MAN), a cellular network, a public switched telephone network (PSTN), any other network, and/or a combination of networks.

Server 130 may include a device such as a computer or another network element.

Information collection gateway (ICG) 140-1 may include one or more devices for performing network-related functions, such as transmission and/or reception of network information to/from network elements 110 and/or backend network device 150.

Backend network device (BND) 150 may include one or more devices that receive network information from ICG 140-1, analyze received network information, and/or transmit reconfiguration information to ICG 140-1 based on the analyzed network information.

Network elements 110, server 130, ICG 140-1, and/or BND 150 may communicate with each other via wired or wireless communication links provided by network 120-1.

As shown in FIG. 1B, a network 100-2 may include a number of network elements 110, networks 120-1 and 120-2, server 130, information collection gateways 140-1 and 140-2, backend network device 150, and/or a backend network 160. As described above, network elements 110 may include one or more devices for performing network-related functions (e.g., a router, a switch (e.g., a provider edge (PE) router in a MPLS network), etc.).

Networks 120-1 and 120-2 may include the Internet, an ad hoc network, a local area network (LAN), a wide area network (WAN), a metropolitan area network (MAN), a cellular network, a public switched telephone network (PSTN), any other network, and/or a combination of networks. In one example, networks 120-1 and 120-2 may be owned and operated by a single company, such as "company A".

Server 130 may include devices such as a computer or another network element.

Information collection gateways (ICGs) 140-1 and 140-2 may include one or more devices for performing network-related functions (in networks 120-1 and 120-2 respectively), such as transmission and/or reception of network information to/from network elements 110 and/or BND 150.

BND 150 may include one or more devices that receive network information from ICGs 140-1 and 140-2, analyze received network information, and/or transmit reconfiguration information to ICGs 140-1 and 140-2 based on the analyzed network information.

Backend network 160 may include a local area network (LAN) or a wide area network (WAN), any other network, and/or a combination of networks. In one example, backend network 160 may be owned and operated by a vendor of the network elements 110.

Network elements 110, server 130, ICGs 140-1 and 140-2, and/or BND 150 may communicate with each other via wired or wireless communication links provided by networks 120-1 and 120-2 and/or backend network 160.

As shown in FIG. 1C, a network 100-3 may include network elements 110, networks 120-1 and 120-3, information collection gateways 140-1 and 140-3, BND 150, and/or backend network 160. As described above, network elements 110 may include one or more devices for performing network-related functions (e.g., a router, a switch (e.g., a provider edge (PE) router in a MPLS network), etc.).

Networks 120-1 and 120-3 may include the Internet, an ad hoc network, a local area network (LAN), a wide area network (WAN), a metropolitan area network (MAN), a cellular network, a public switched telephone network (PSTN), any other network, and/or a combination of networks. In one example, networks 120-1 and 120-3 may be independent networks owned and operated by two separate companies. For example "company A" may operate network 120-1 and "company B" may operate network 120-3.

Information collection gateways (ICGs) 140-1 and 140-3 may include one or more devices for performing network-related functions, such as transmission and/or reception of network information to/from network elements 110 and backend network device 150. ICGs 140-1 to 140-3 may be configured similarly, and/or may be referred to collectively as an ICG 140.

BND 150 may include one or more devices that receive network information from ICGs 140-1 and 140-3, analyze received network information, and/or transmit reconfiguration information to ICGs 140-1 and 140-3 based on the analyzed network information.

Network elements 110, ICGs 140-1 and 140-3, and/or BND 150 may communicate with each other via wired or wireless communication links provided by networks 120-1 and 120-2 and/or backend network 160.

Although FIGS. 1A-1C show exemplary components of networks 100-1 to 100-3, in other implementations, networks 100-1 to 100-3 may contain fewer, different, or additional components than depicted in FIGS. 1A-1C. In still other implementations, one or more components of networks 100-1 to 100-3 may perform one or more of the tasks described as being performed by one or more other components of networks 100-1 to 100-3.

Figure 2:
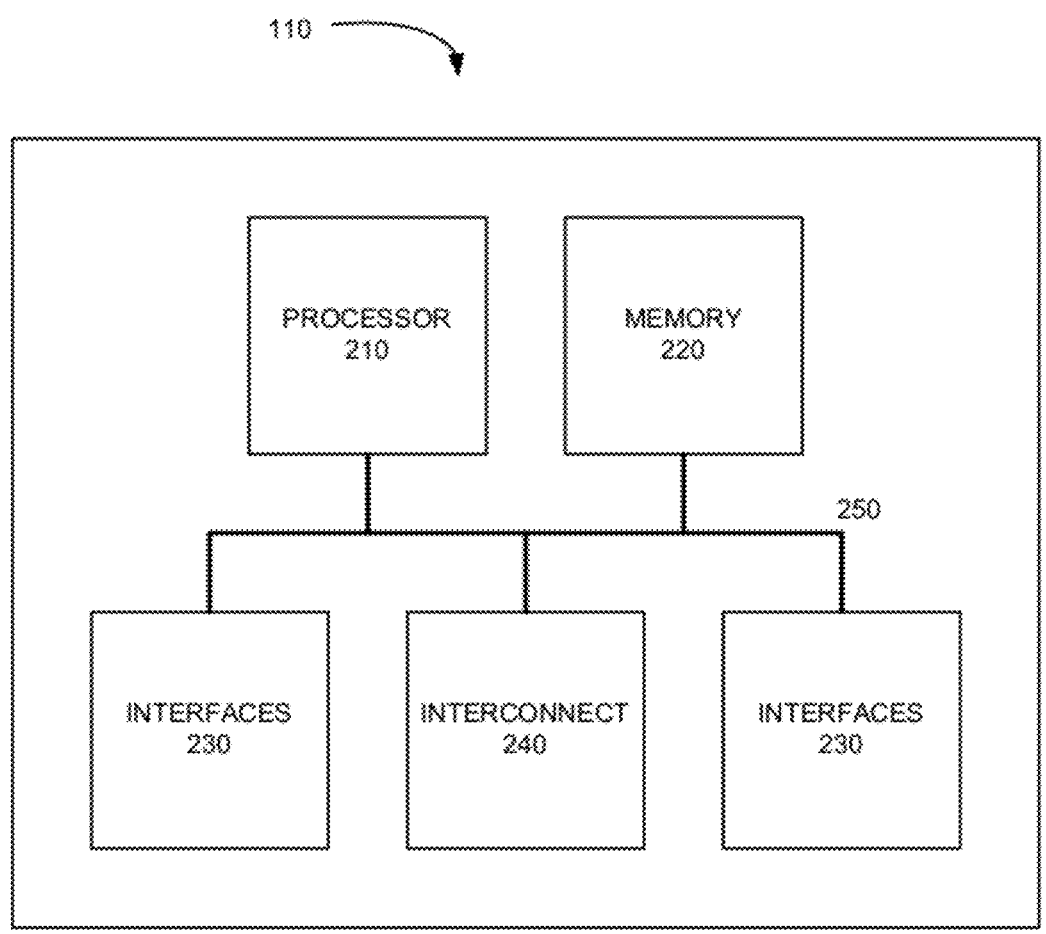
FIG. 2 is a block diagram of an exemplary network device of FIGS. 1A-1C.

FIG. 2 shows an exemplary block diagram of exemplary components of one of network elements 110. As shown, a network element 110 may include a processor 210, memory 220, interfaces 230, an interconnect 240, and a bus 250. In other implementations, network element 110 may include fewer, additional, or different components than those illustrated in FIG. 2.

Processor 210 may include one or more processors, microprocessors, application specific integrated circuits (ASICs), field programming gate arrays (FPGAs), and/or processing logic optimized for networking and communications.

Memory 220 may include static memory, such as read only memory (ROM), dynamic memory, such as random access memory (RAM), and/or onboard cache, for storing data and machine-readable instructions. Memory 220 may also include storage devices, such as a floppy disk, a CD ROM, a CD read/write (R/W) disc, and/or flash memory, as well as other types of storage devices.

Interfaces 230 may include one or more devices for receiving incoming data streams from networks and/or for transmitting data to networks. For example, interfaces 230 may include Ethernet cards, optical carrier (OC) interfaces, asynchronous transfer mode (ATM) interfaces, etc.

Interconnect 240 may include one or more switches or switch fabrics for directing incoming network traffic from one of interfaces 230 to another one of interfaces 230.

Bus 250 may include a path that permits communication among processor 210, memory 220, interfaces 230, and/or interconnects 240.

The components depicted in FIG. 2 may provide fewer or additional functionalities. For example, if network element 110 performs an Internet Protocol (IP) packet routing function as part of a MPLS router, processor 210 may perform tasks associated with obtaining routing information from other routers in a MPLS network. In such cases, conveying network traffic from one of interfaces 230 to another one of interfaces 230 may involve label based routing, rather than IP address based routing.

Figure 3:
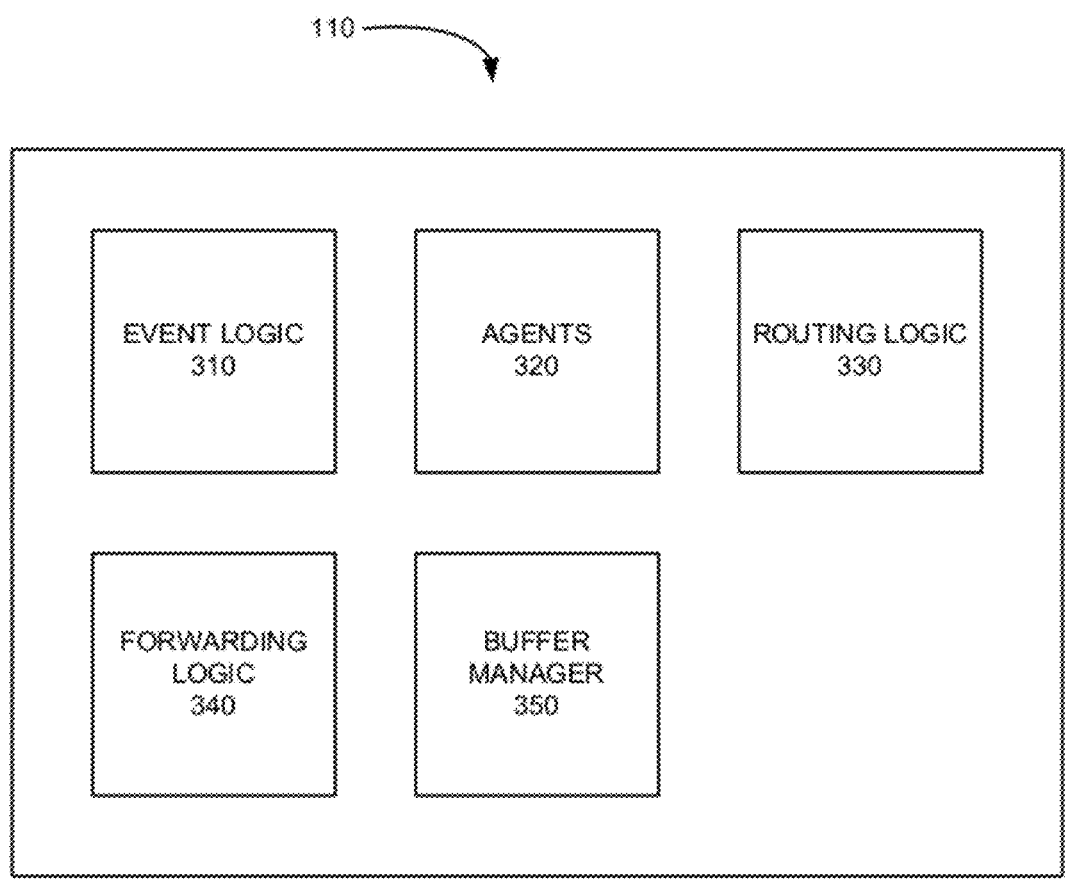
FIG. 3 is a functional block diagram of the network device of FIGS. 1A-1C and 2.

FIG. 3 is a block diagram depicting exemplary functional components of one of network elements 110. As shown, network element 110 may include event logic 310, agents 320, routing logic 330, forwarding logic 340, and/or buffer manager 350. In other implementations, network element 110 may include fewer, additional, or different components than those illustrated in FIG. 3. For example, network element 110 may or may not provide certain network management functions, and in such instances, network element 110 may not include certain agents 320.

Event logic 310 may include hardware and/or software based logic for performing various event driven functions for management and operation of network element 110. Event logic 310 may create and transmit an XML problem report bundle, based on a detected event, to other network elements 110. For example, event logic 310 may provide embedded reactive and proactive scripts used to collect and analyze data to monitor performance within network element 110. Event logic 310 may correlate events and/or time periods, and, in response to the analysis of correlated events/time periods, may make decisions to reconfigure operations of network element 110. Event logic 310 may provide an interface that may transmit and/or receive XML problem report bundles to/from another network device (such as another network element 110 and/or ICG 140). Additional information about event logic 310 is provided below in connection with FIG. 4.

Agents 320 may include hardware and/or software based logic for monitoring and/or controlling components on behalf of event logic 310. The monitored components may include a physical device (e.g., a plug-in card, a multiplexer, a switch, etc.) or a logical device (e.g., a virtual connection or a logical interface). If monitoring the components, agents 320 may detect a fault and/or a recovery of an interface, an interconnect, and/or any other component of network element 110, and/or may report the fault and/or the recovery to event logic 310. For example, agents 320 may detect a failure of one of interfaces 230, and/or may send associated alarms and/or error messages to event logic 310. In another example, agents 320 may receive commands from a remote device, and/or may make appropriate configuration changes to interfaces 230. In other implementations, agents 320 may be attached and/or connected to other subcomponents of network element 110.

Routing logic 330 may include hardware and/or software based logic for communicating with other routers to gather and/or store routing information in a routing information base (RIB).

Forwarding logic 340 may include hardware and/or software based logic for directing a packet to a proper output port on one of interfaces 230 based on routing information in the RIB.

Buffer manager 350 may include a buffer for queuing incoming packets. If packets arrive simultaneously, one or more of the packets may be stored in the buffer until higher priority packets are processed and/or transmitted.

Figure 4:
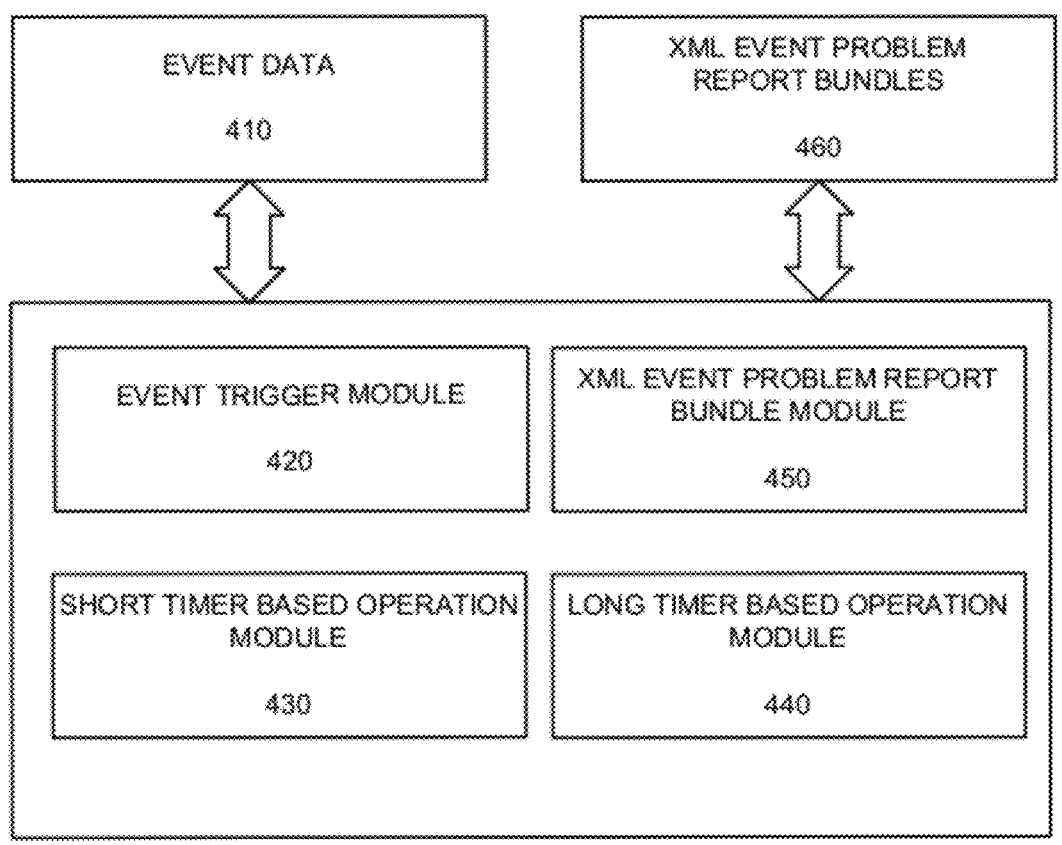
FIG. 4 is a functional block diagram of event logic of FIG. 3.

FIG. 4 depicts a block diagram of exemplary functional components of event logic 310. As shown, event logic 310 may include an event trigger module 420, a short timer based operation module 430, a long timer based operation module 440 and an XML event problem report bundle module 450. As further shown in FIG. 4, event logic 310 may transmit and/or receive event data 410 and/or XML event problem report bundles 460. In different implementations, event logic 310 may include fewer, additional, or different components than those illustrated in FIG. 4.

Event data 410 may include information related to events and/or the status of hardware and software contained within network element 110. For example, the components shown in FIG. 2, such as processor 210, memory 220, interfaces 230, and/or interconnect 240, may provide signals and information identifying certain events. For example, processor 210 may provide event data 410 that includes information relating to the status of internal registers becoming overloaded and/or unused. The functional components shown in FIG. 3 may provide event data 410 that includes information related to status and/or events. For example, routing logic 330 may provide event data 410 that includes information indicating a processing failure regarding routing information base (RIB).

Event trigger module 420 may include hardware and/or software based logic that may receive a signal from XML problem report bundle module 450, and may invoke a script. For example, a process may be contained within a script that may identify a hardware or software problem, collect data relating to the identified problem, perform an analysis of the collected data, perform a corrective action based on the analysis, and/or send the collected data to XML event problem report bundle module 450. The analysis performed by an invoked script within event trigger module 420 may include any appropriate analysis algorithm, such as, for example, a decision tree or an artificial intelligence database. The specific type of analysis performed by each script may be determined by the specific event/policy that invoked the script. For example, if event data 410 contains information that some component of network element 110 is using 90% of processor resources, a script contained in event trigger module 420 may be invoked by XML problem report bundle module 450 to collect data and to determine what component is using the resources, what is the nature of the problem, and/or what if any corrective actions may be taken. Scripts invoked by event trigger module 420 may be referred to as "reactive" scripts, as these scripts may be invoked to react to a received event.

Short timer based operation module 430 may include hardware and/or software based logic that may receive a signal from XML event problem report bundle module 450, and/or may invoke a script. For example, upon detection of an event and/or short timer value expiring, XML event problem report bundle module 450 may invoke a script contained in short timer based operations module 430. Scripts contained in short timer based operation module 430 may identify a hardware and/or software problem, collect data relating to the identified problem, perform an analysis of the collected data, perform a corrective action based on the analysis, and/or send collected data to XML event problem report bundle module 450. The analysis performed by an invoked script within short timer based operation module 430 may include any appropriate analysis algorithm such as, for example, a decision tree or an artificial intelligence database. The specific type of analysis performed by each script may be determined by a specific short timer value that may have expired within XML event problem report bundle module 450. Scripts invoked by short timer based operation module 430 may also be referred to as "reactive" scripts, as they may be invoked to react to expiration of a short timer value.

Long timer based operation module 440 may include hardware and/or software based logic that may receive a signal from XML event problem report bundle module 450, and/or may invoke a script. For example, upon detection of an event or long timer value expiring, XML problem report bundle module 450 may invoke a script contained in long timer based operation module 440. For example, a script contained in long timer based operation module 440 may collect data, and/or may transmit the collected data to XML event problem report bundle module 450 to create XML event problem report bundles 460. XML event problem report bundles 460 may be transmitted to another network device to be analyzed to determine long term trends of network element 110. Data collected by a script invoked by long timer based operation module 440 may be strategically analyzed (e.g., by BND 150) to determine potential risks and/or failures that may occur within network element 110. Scripts invoked by long timer based operation module 440 may be referred to as proactive scripts, as the data collected and analyzed may relate to successful operations of network element 110, and may be used to "proactively" reconfigure hardware and/or software within network element 110 before a problem and/or error occurs.

XML event problem report bundle module 450 may include event policies and/or time periods that may be used to process received event data 410, and, in response to the received event, time period, etc, to invoke scripts contained in modules 420-440. For example, XML event problem report bundle module 450 may store events and/or information relating to an appropriate script and/or module 420-440 to invoke. After determining an appropriate script to invoke, XML event problem report bundle module 450 may send signals and/or information to the appropriate module (e.g., modules 420-440) so that further processing of data may be performed. XML event problem report bundle module 450 may receive data collected by the scripts invoked (e.g., by modules 420-440), and/or may form XML event problem report bundles 460 with the collected data. For example, XML event problem report bundle module 450 may store XML document structures, parameters, and/or tagged fields relating to all the types of events, short time periods, and/or long time periods that may be detected. Each event and/or time period may be associated with an appropriate XML document and/or file structure that may include XML header information and/or XML payload information. In one example, XML event problem report bundle module 450 may receive data collected from a script contained in event trigger module 420 that relates to a detected interface failure. This collected data may be received by XML event problem report bundle module 450, and/or an appropriate XML file header may be determined based on the invoked script. Based on the parameters contained in the XML header file, specific XML payload files may be determined. Using the data received from the script, XML event problem report bundle module 450 may tag the data in order to generate the XML header file and/or corresponding XML payload files. XML event problem report bundle module 450 may bundle the XML header file and/or corresponding XML payload files for transmission to ICG 140 and to BND 150 as XML event problem report bundles 460.

XML event problem report bundles 460 may include XML header files and/or XML payload files that contain data and/or information collected by scripts contained in modules 420-440. Data contained in XML header files may include predefined XML tagged fields used to describe and/or label information. Each of XML event problem report bundles 460 may contain four sections (e.g., one XML header file (manifest) section, and three sections of XML payload files such as a configuration section, a trend section and attachments). The XML header file may contain tagged fields, such as, for example, host-event ID, service type, problem class, problem description, priority severity, problem priority, core file path, product name, host name, version information, time of event, core manifest, software stack trace, show chassis hardware, show chassis firmware, and/or problem synopsis. Using these exemplary fields, information contained in a XML header file may be identified and/or accessed by a recipient (e.g. ICG 140 and/or BND 150) of an XML event problem report bundle 460.

XML payload files included in an XML event problem report bundle 460 may include information in tagged fields. XML payload files may include sections such as a configuration section, a trend section, and/or attachments. The specific XML payload file sections may be determined by the problem class field identified in the XML header file. For example, if a problem class error is a hardware failure, specific tagged fields may be included in the XML payload files that provide information relating to the hardware failure. If, for example, the problem class error is a software error, specific tagged fields may be included in the XML payload files that provide information relating to the software error. Examples of tagged fields included in the trend section of the XML payload files may include fields, such as routing engine, show chassis routing engine, flexible PIC connector (FPC), show chassis FPC (brief), show chassis FPC (detail), show nhdb zones (T-series), show nhdb zones (M-series), show bchip ucode bind (M-series), packet forwarding engine (PFE), show PFE statistics traffic, system, show system buffers, show system processes extensive, show system uptime, (SCB), show chassis SCB, show chassis (feb), show chassis sfm (brief), show chassis sfm (detail), show chassis forwarding, etc. Using descriptive payload fields, information contained in XML payload files may be easily identified and/or accessed by a recipient of a XML problem report bundle 460.

In addition to files containing tagged fields of information, the XML payload files may include attachment files that may not include tagged fields of information. For example, an exemplary attachment file may include numerical data relating to memory statistics by size, memory statistics by type, and/or other text information relating to memory operations within a network element 110. It should be understood that more, less and/or different tagged fields of information may be included in XML event problem report bundles 460 based on any of the detected event, the invoked script, or the identified information contained in the problem class field included in the XML header file. In each instance, using specifically determined and descriptive tagged field names, a recipient (e.g., ICG 140 and/or BND 150) of an XML event problem report bundle 460 may quickly identify and access information associated with each specific event.

Figure 5:
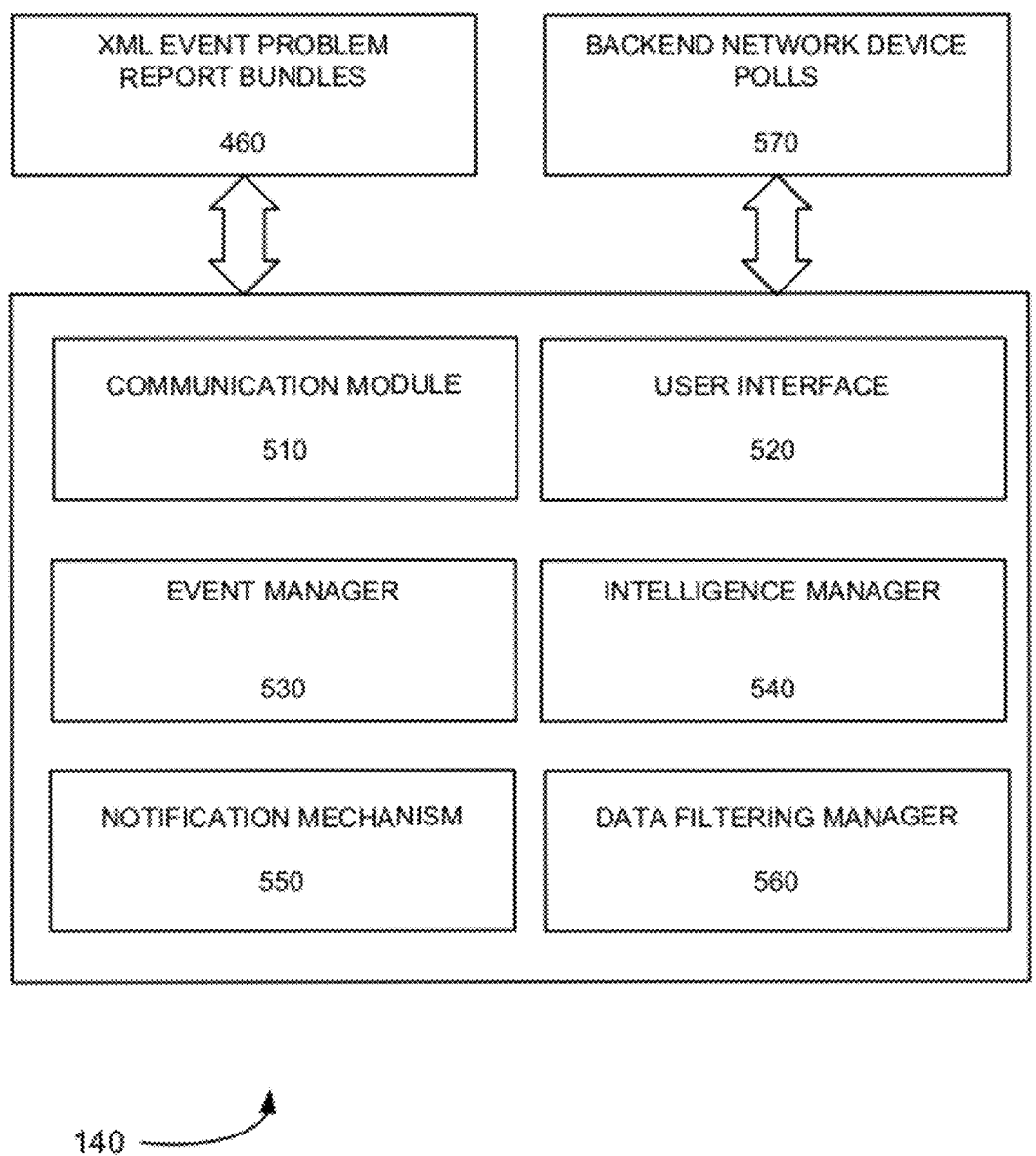
FIG. 5 is a functional block diagram of an exemplary information collection gateway of FIGS. 1A-1C.

FIG. 5 depicts a block diagram of exemplary functional components of ICG 140. As shown, ICG 140 may include a communication module 510, a user interface 520, an event manager 530, an intelligence manager 540, a notification mechanism 550, and/or a data filtering manager 560. ICG 140 may transmit and/or receive XML event problem report bundles 460 and/or may transmit backend network device polls 570. In different implementations, ICG 140 may include fewer, additional, or different components than those illustrated in FIG. 5.

Communication module 510 may include one or more devices configured to transmit and/or receive XML event problem report bundles 460 and/or backend network device polls 570 to/from ICG 140. For example, communication module 510 may receive an XML event problem report bundle 460 from one of network elements 110 and may transmit the XML event problem report bundle 460 to backend network device 150. Communication module 510 may transmit/receive information to/from backend network device 150 via backend network device polls 570.

User interface 520 may include hardware and/or software based logic for allowing an operator to interface with ICG 140. For example, user interface 520 may include a display and/or a keyboard, with which a user may interact with data displayed via a display. User interface 520 may provide information relating to events and/or errors within a network and may allow a user to determine if a received XML event problem report bundles 460 may be transmitted to BND 150.

Event manager 530 may include hardware and/or software based logic that may receive an XML event problem report bundle 460 from one of network elements 110 and may store data with a corresponding event. For example, event manager 530 may store a memory error (identified in a received XML header file) with the corresponding memory data (identified in a received XML payload file). Event manager 530 may correlate and/or store events and/or data for a number of network elements within a network. For example, event manager 530 contained in ICG 140-1 may store events and/or data for all network elements 110 in network 120-1, and similarly, event manager 530 contained in ICG 140-3 may store events and/or data for all network elements 110 in network 120-3.

Intelligence manager 540 may include hardware and/or software based logic that may receive an XML event problem report bundle 460 and/or may collect information relating to identified events. Intelligence manager 540 may determine if there is reconfiguration information to correct the error and/or event identified in the received XML event problem report bundle 460. For example, ICG 140 may obtain reconfiguration information from BND 150 and/or may store this reconfiguration information with a corresponding type of error and/or event. In response to receiving an XML event problem report bundle 460, intelligence manager 540 may provide reconfiguration information to one of network elements 110 based on the received type of event included in the XML event problem report bundle 460. In further examples, if intelligence manager 540 receives an updated software process (e.g., from BND 150), intelligence manager 540 may transmit the new software process to all network elements 110 within network 120-1.

Notification mechanism 550 may include hardware and/or software based mechanisms for notifying an operator of ICG 140 that a specific type of event and/or error has occurred, as determined from data within a received XML event problem report bundle 460. For example, notification mechanisms may include sending an email, alerting an administrator that a specifically identified type of error and/or event has occurred, etc.

Data filtering manager 560 may include hardware and/or software based mechanisms for identifying and/or filtering data within XML event problem report bundles 460. For example, data filtering manager 560 may filter received XML event problem report bundles 460 for identified types of events and types of XML event problem report bundles 460 and/or may determine if the received XML event problem report bundles 460 contain the identified type of event or type of data. For example, XML event problem report bundles 460 generated by the process described below in connection with FIG. 7 may be automatically identified and/or filtered to be transmitted to BND 150, whereas XML event problem report bundles 460 generated by the process described below in connection with FIG. 8 may be filtered to identify if they include specific types of events or errors that may be transmitted to BND 150 for further processing. For network security purposes, data filtering manager 560 may filter data within XML event problem report bundles 460 to ensure that no confidential information is contained within transmitted XML event problem report bundles 460.

Figure 6:
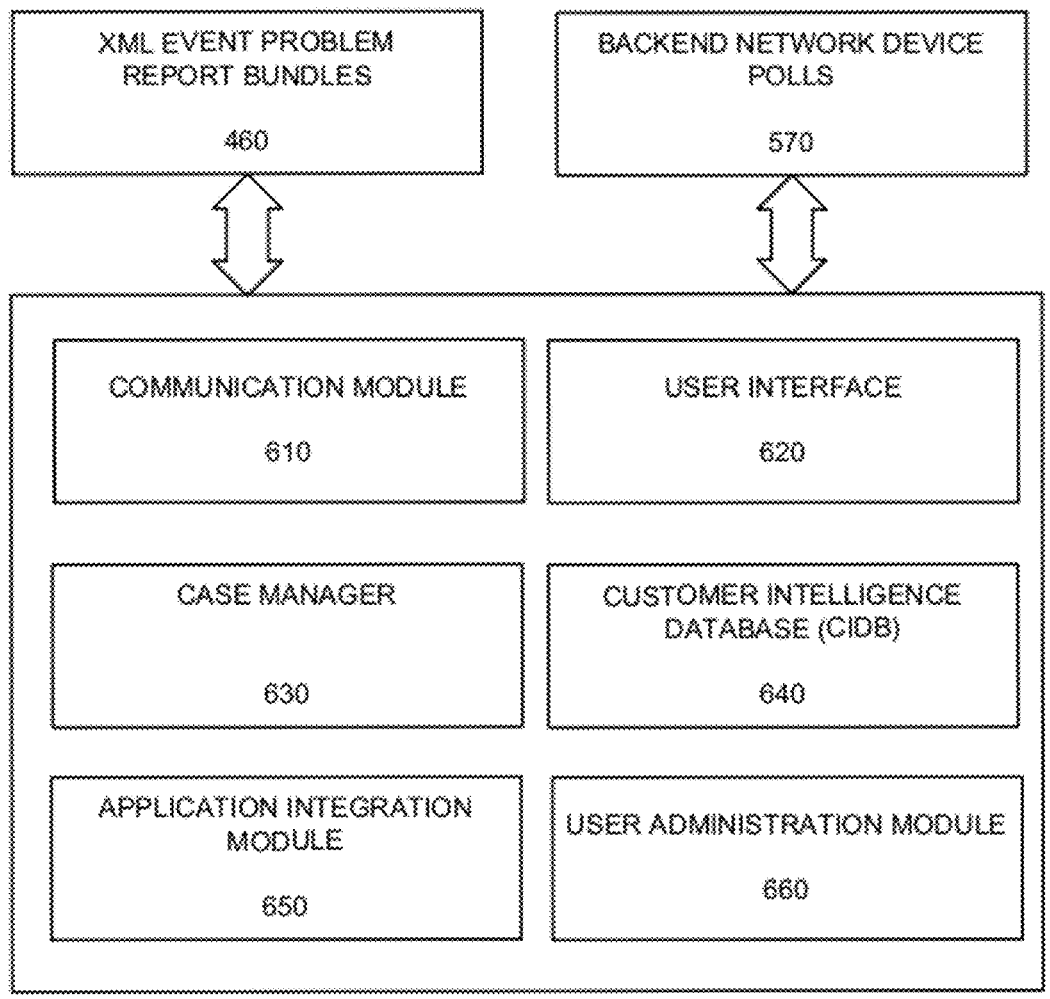
FIG. 6 is a functional block diagram of an exemplary backend network device of FIGS. 1A-1C.

FIG. 6 depicts a block diagram of exemplary functional components of BND 150. As shown, BND 150 may include a communication module 610, a user interface 620, a case manager 630, a customer intelligence database 640, an application integration module 650 and a user administration module 660. BND 150 may transmit and/or receive XML event problem report bundles 460 and/or backend network device polls 570 from ICG 140. In different implementations, BND 150 may include fewer, additional, or different components than those illustrated in FIG. 6.

Communication module 610 may include one or more devices configured to receive XML event problem report bundles 460 and backend network device polls 570 from ICG 140. For example, communication module 610 may receive XML event problem report bundles 460 from ICG 140. Communication module 610 may also receive backend network device polls 570 from ICG 140.

User interface 620 may include hardware and/or software based logic for allowing an operator to interface with BND 150. For example, user interface 620 may include a display and/or a keyboard, with which a user may interact with BND 150. User interface 620 may provide alerts and/or issues detected within networks 120 and/or may allow a user to display and/or analyze data included in received XML event problem report bundles 460.

Case manager 630 may include mechanisms to receive XML event problem report bundles 460 and produce a new case trouble ticket. For example, case manager 630 may include a customer relationship manager (CRM) tool that may directly map to and extract information contained in a received XML header file in order to form a new case problem ticket and a corresponding case ID. For example, information contained in tagged fields (e.g., problem description, platform, time of problem, serial number, priority, severity of event, etc.) may be automatically extracted and/or a placed into a new case problem ticket.

Customer Intelligence Database CIDB 640 may include hardware and/or software based logic that may receive XML event problem report bundles 460 and/or may store and analyze the data included therein. For example, CIDB 640 may identify a hardware and/or software problem, analyze data relating to the identified problem, and/or determine reconfiguration information based on the analyzed data received within an XML event problem report bundle 460. The analysis performed by CIDB 640 may include any appropriate analysis algorithm such as, for example, a decision tree or an artificial intelligence database. The specific type of analysis performed by CIDB 640 may be determined by the type of network, event and/or data included within the XML event problem report bundles 460. For example, CIDB 640 may contain algorithms to perform trend analysis, detect increments of critical counter values, and measure or detect memory leaks, and may also create scripts based on the collected and analyzed data. For example, if a trend is positively identified by an algorithm, a script may be created to reconfigure component(s) within network element 110 in order to adjust to the determined trend. If, for example, a component within network element 110 is positively identified by an algorithm within CIDB 640 as using 90% of the processor's resources, a script may be created to collect data from the identified component to further determine the nature of the problem. This script (reconfiguration information) may be obtained from CIDB 640 within BND 150 during a backend network device poll 570 instigated by ICG 140.

Application integration module (APIM) 650 may include one or more mechanisms for receiving XML event problem report bundles 460 and communicating data between case manager 630 and CIDB 640.

User administration module 660 may include one or more mechanisms for allowing administrators to access information in BND 150, such as data stored in CIDB 640. For example, user administration module 660 may provide passwords for users and/or administrators, and may allow access to data, based on the user's/administrator's level of clearance.

Figure 7:
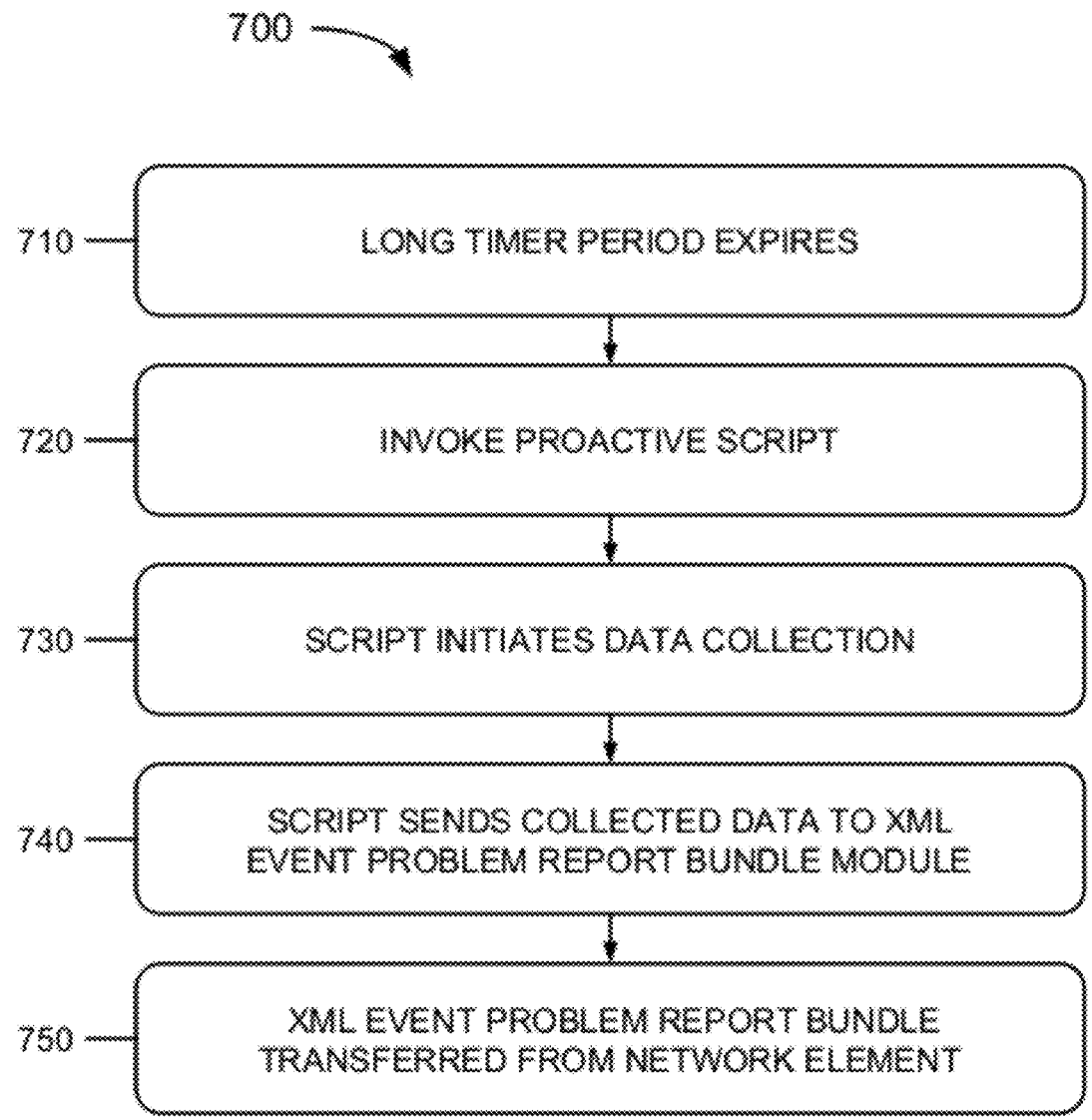
FIG. 7 is a flowchart of an exemplary proactive process.

FIG. 7 is a flowchart illustrating an exemplary proactive process 700 that may be performed in one of network elements 110. Process 700 may begin with expiration of a long timer value (block 710). For example, a timer value contained in XML event problem report bundle module 450 may expire. As described above, the timer values contained in XML event problem report bundle module 450 may be on the order of days, weeks, months, etc. Each individual timer value may include a corresponding proactive script contained in long timer based operations module 440 that is invoked upon timer expiration (block 720).

Once invoked, a proactive script may initiate data collection (block 730). For example, a script may initiate collection of data at one of interfaces 230 or an invoked script may initiate collection of data relating to the operations of processor 210. The invoked proactive script may send the collected data to XML event problem report bundle module 450 (block 740). Details of creating XML event problem report bundles 460 are described below in connection with FIG. 9.

Returning to FIG. 7, XML event problem report bundle 460 may be generated that contains the collected data that may relate to one of interfaces 230. The XML event problem report bundle 460 may be transferred to ICG 140 (block 750). For example, network element 110 may transmit an XML event problem report bundle 460 to ICG 140 for storage and analysis of the collected data. Further details of receiving and analyzing an XML event problem report bundle 460 are described below in connection with FIGS. 10 and 11.

Figure 8:
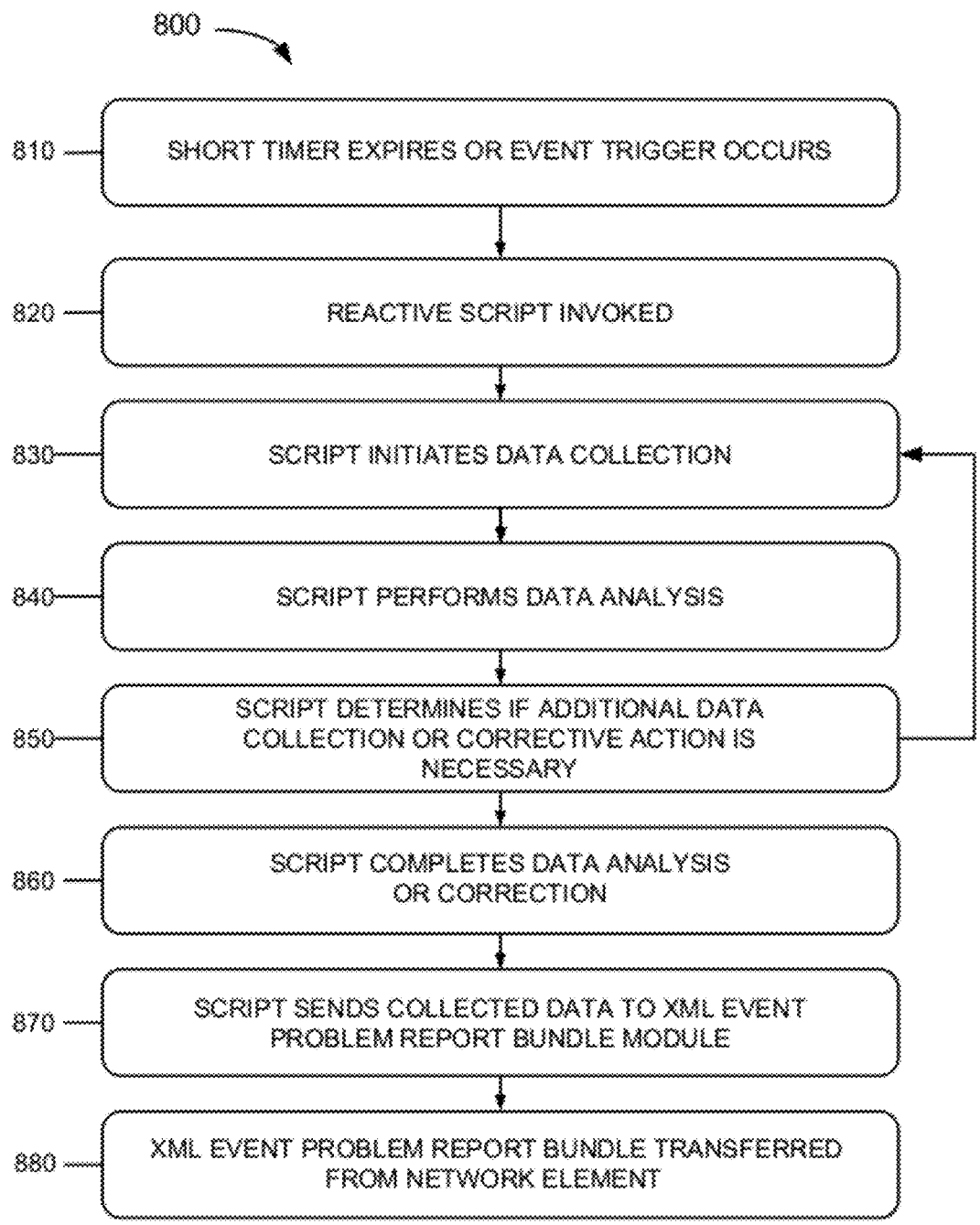
FIG. 8 is a flowchart of an exemplary reactive process.

FIG. 8 is a flowchart illustrating an exemplary reactive process 800 that may be performed in one of network elements 110. Process 800 may begin expiration of a short timer and/or occurrence of an event trigger (block 810). For example, event 410 may be received and may be compared to event policies contained in XML event problem report bundle module 450. Each event and short timer value in XML event problem report bundle module 450 may be associated with a corresponding reactive script contained in short timer based operations module 430. Upon detection of an event or time period, and association with event policies, XML event problem report bundle module 450 may invoke a reactive script contained in short timer based operations module 430 (block 820).

If invoked, a reactive script may initiate data collection (block 830). For example, received event 410 may result in invoking a reactive script contained in event trigger module 420. Received event 410 may be, for example, that 50% of memory 220 is being used, which may indicate a potential memory leak. Data may be collected relating to hardware aspects of memory 220 and data may be collected relating to software processes or operations that may currently be accessing memory 220. The data collected regarding the operation of memory 220 may be analyzed (block 840). For example, the analyzed data may indicate that hardware aspects of memory 220 are functioning properly. Other data collected by the invoked reactive script may relate to the amount of data stored in routing tables or forwarding tables contained in routing information base (RIB). This data may be analyzed to determine if a certain portion (e.g., 50%) of memory usage is normal based on the information in RIB.

Based on the analysis performed in block 840, the invoked script may determine if additional data collection may be necessary and/or if corrective action may be taken (block 850). Continuing with the above example, if the analysis of the data relating to the RIB indicates that the network element is currently receiving large amounts of data, a 50% memory usage may be determined to be acceptable and no corrective action may be taken, and script may complete the data analysis and/or corrective actions (block 860).

If, for example, analysis of the data indicates that a small amount of data is being received by network element 110, this may indicate that a memory leak is occurring and another reactive script may be invoked to collect data relating to other processes currently accessing memory 220 (block 850). An additionally invoked reactive script may collect and analyze data and determine that a software process is not releasing memory space within memory 220. In response to this analysis, the script may take corrective action by shutting down the detected faulty software process and/or launching another process to replace the faulty software (block 860).

The reactive script may send the collected data to XML event problem report bundle module 450 (block 870). For example, corrective actions taken and/or data collected by the invoked script may be sent to XML event problem report bundle module 450, so that an XML event problem report bundle 460 may be generated. Further details of generating an XML event problem report bundle 460 are described below in connection with FIG. 9. The generated XML event problem report bundle 460 may be transferred to ICG 140 (block 880). For example, an event problem report bundle 460 may be transferred from network element 110 to ICG 140 via network 120. Further details of receiving and processing an XML event problem report bundle 460 are described below in connection with FIGS. 10 and 11.

Figure 9:
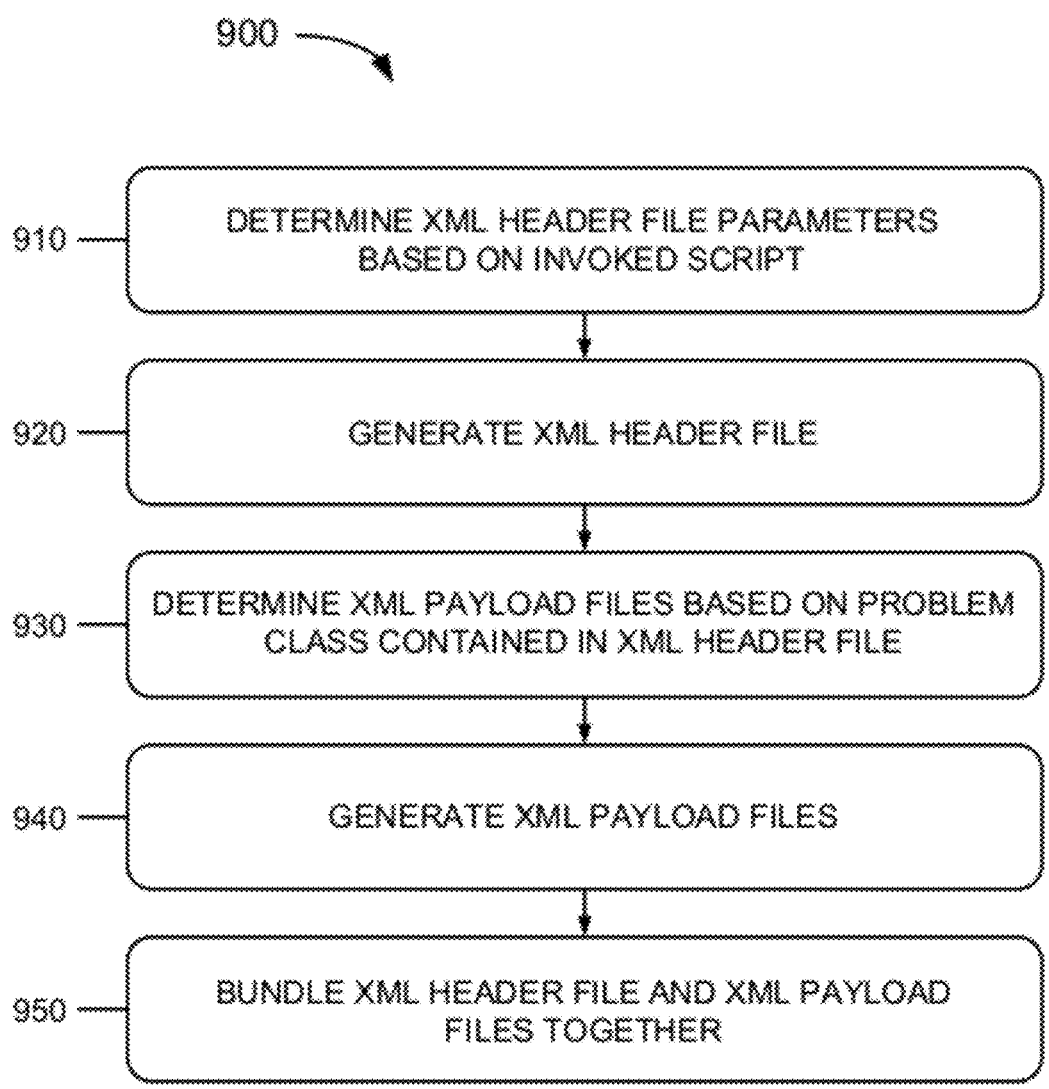
FIG. 9 is a flowchart of an exemplary process for creating Extensible Markup Language (XML) event problem report bundles.

FIG. 9 is a flowchart illustrating an exemplary XML event problem report bundle generation process 900. As mentioned above, process 900 may be enacted in blocks 740-750 (as shown in FIG. 7) or blocks 870-880 (as shown in FIG. 8). Process 900 may begin if XML event problem report bundle module 450 receives data collected by a script and determines an XML header file based on the invoked script (block 910). For example, XML event problem report bundle module 450 may receive data collected by a script invoked by an event, and, based on the invoked script associated with this event, the appropriate XML header file structure and parameters may be selected. The XML header file parameters may include tagged fields of information such as, for example, host-event ID, service type, problem class, problem description, priority severity, problem priority, core file path, product name, host name, version information, time of event, core manifest, software stack trace, show chassis hardware, show chassis firmware, problem synopsis, etc.

After the appropriate XML header file parameters have been determined, the XML header file may be generated (block 920). For example, the information for each determined tagged field within the header may be completed and tagged. After the XML header file has been generated, XML payload files may be determined based on the problem class field contained in the XML header file (block 930). For example, XML event problem report bundle module 450 may store and associate tagged fields of information that may be included in XML payload files for each type of problem class field in an XML header file. As described above, a software error identified in the problem class field of the XML header file may be associated with specific payload fields to be included in the XML payload files and a hardware failure identified in the problem class field of the XML header file may be associated with specific payload fields to be included in the XML payload files.

After the appropriate XML payload files have been determined, the XML payload files may be generated (block 940). For example, information relating to the determined problem class of the detected event may be tagged with the associated specific payload fields, to form an XML payload file as shown above. In other examples, attachment files that do not necessarily contain tagged fields, for example memory usage files, may be included in the XML payload files. If the XML payload files have been generated, XML event problem report bundle module 450 may bundle the XML header file and XML payload files together to form an XML event problem report bundle 460 (block 950). If bundled, the XML event problem report bundle 460 may be transmitted (as shown in blocks 750 and 880) to ICG 140. In this manner, XML event problem report bundle module 450 may provide a descriptive and flexible system of report errors within a network element 110.

Figure 10:
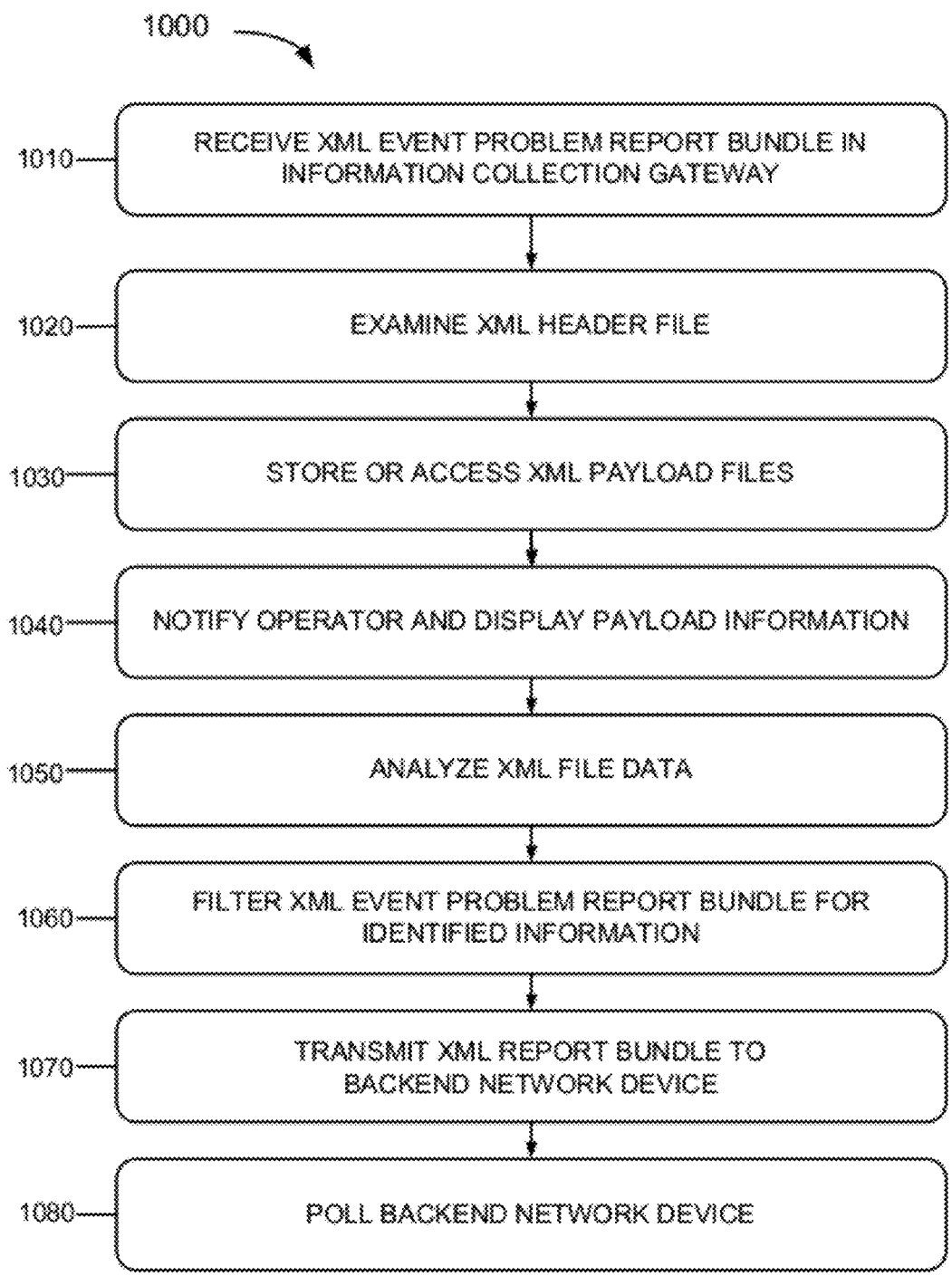
FIGS. 10 and 11 are flowcharts of exemplary processes for receiving and processing an XML event problem report bundle.

FIG. 10 is a flowchart illustrating an exemplary process 1000 for receiving an XML event problem report bundle 460. Process 1000 may begin if an XML event problem report bundle 460 is received by ICG 140 (block 1010). For example, one of network elements 110 may have generated and transmitted an XML event problem report bundle 460 as described above. After being received by communication module 510 in ICG 140, the XML header file included in the XML event problem report bundle 460 may be examined (block 1020). For example, event manager 530 may include data mining and processing tools that may search for, or map directly to, identified specific tagged fields of information contained within XML header file. For example, an operator of ICG 140 may be concerned with specifically identified network elements (such as one of network elements 110) or specific types of errors that may occur. In this case, ICG 140 may be programmed via user interface 520 to automatically search for all received XML event problem report bundles 460 for specific tagged fields of information contained within the XML header files. When an XML header file is identified as including a specifically identified tagged field, ICG 140 (or an operator) may quickly determine that information contained in the XML payload files should be further accessed and/or analyzed.

Based on an examination of the XML header file, the XML payload files may be stored and/or accessed (block 1030). For example, if an XML header file does not contain specifically identified tagged fields of interest to an operator, the entire contents of the received XML event problem report bundle 460 may be stored in ICG 140. If however, the XML header file contains specifically identified tagged fields of interest, such as a specific network element or a specific type of event, the XML payload files may be accessed. For example, XML payload files may be identified automatically by event manager 530, to search for identified keywords or tagged fields within the XML payload files. In one example, an operator may program ICG 140 (via user interface 520) to automatically check a tagged problem severity field, and if the information in the problem severity field is a "5" (where severity is ranked from 1 to 5, with 5 being the highest value), the information in that corresponding XML payload file may be flagged for displaying and further processing. Additionally, ICG 140 may instigate another action, such as sending an alert email (e.g., via notification manager 550), in response to the determination that a problem severity "5" error has occurred.

After being identified as including specifically identified fields of interest (in block 1020) by event manager 530, ICG 140 may notify the operator and display the information within identified XML payload files for analysis (block 1040). For example, an alert message and a table of numerical data relating to memory statistics based on bucket size may be displayed via user interface 520.

After information in the identified XML payload files are displayed, the data may be analyzed (block 1050). For example, intelligence manager 540 may contain information gathered from previously received XML event problem report bundles 460 and backend network device polls 570, and may associate a new software process or script based on the analyzed data. For example, upon analysis of the data within an XML payload file, intelligence manager 540 may determine that an interface 230 is currently operating, however, based on stored information received in XML event problem report bundles 460 related to interface errors occurring within other network elements, intelligence manager 540 may determine or flag that interface 230 may potentially fail. In another example, the analyzed data in the received XML payload files may indicate that a software process contained in a network element 110 is more than one year old and a new updated software process (received via a backend network device poll 570) may be transmitted to the network element 110. In still further examples, an operator of ICG 140 may also analyze data within XML payload files to determine the nature of errors within a network element 110. An operator of ICG 140 may also determine corrective actions and/or determine whether or not to transmit the XML event problem report bundle 460 to BND 150 for further processing.

After being analyzed, XML event problem report bundles 460 may be filtered (block 1060). For example, data filtering manager 560 may automatically identify received XML event problem report bundles 460 that should be transmitted to BND 150. For example, XML event problem report bundles 460 that were generated based on long timer value operations (as described in FIG. 7) may be identified and filtered to be automatically sent to BND 150. For network security reasons, data filtering manager 560 may automatically identify XML event problem report bundles 460 that may contain confidential information that should not be transmitted to BND 150.

After being filtered, XML event problem report bundles 460 may be transmitted to BND 150 (block 1070). For example, communication module 510 may transmit an XML event problem report bundle 460 to BND 150 for further analysis and processing (as described in FIG. 11). After transmitting the XML event problem report bundle 460, ICG 140 may poll BND 150 (block 1080). For example, ICG 140 may periodically poll BND 150 in order to receive reconfiguration information that may be used to correct errors and reconfigure a network element 110. Reconfiguration information may include an updated software process.

Figure 11:
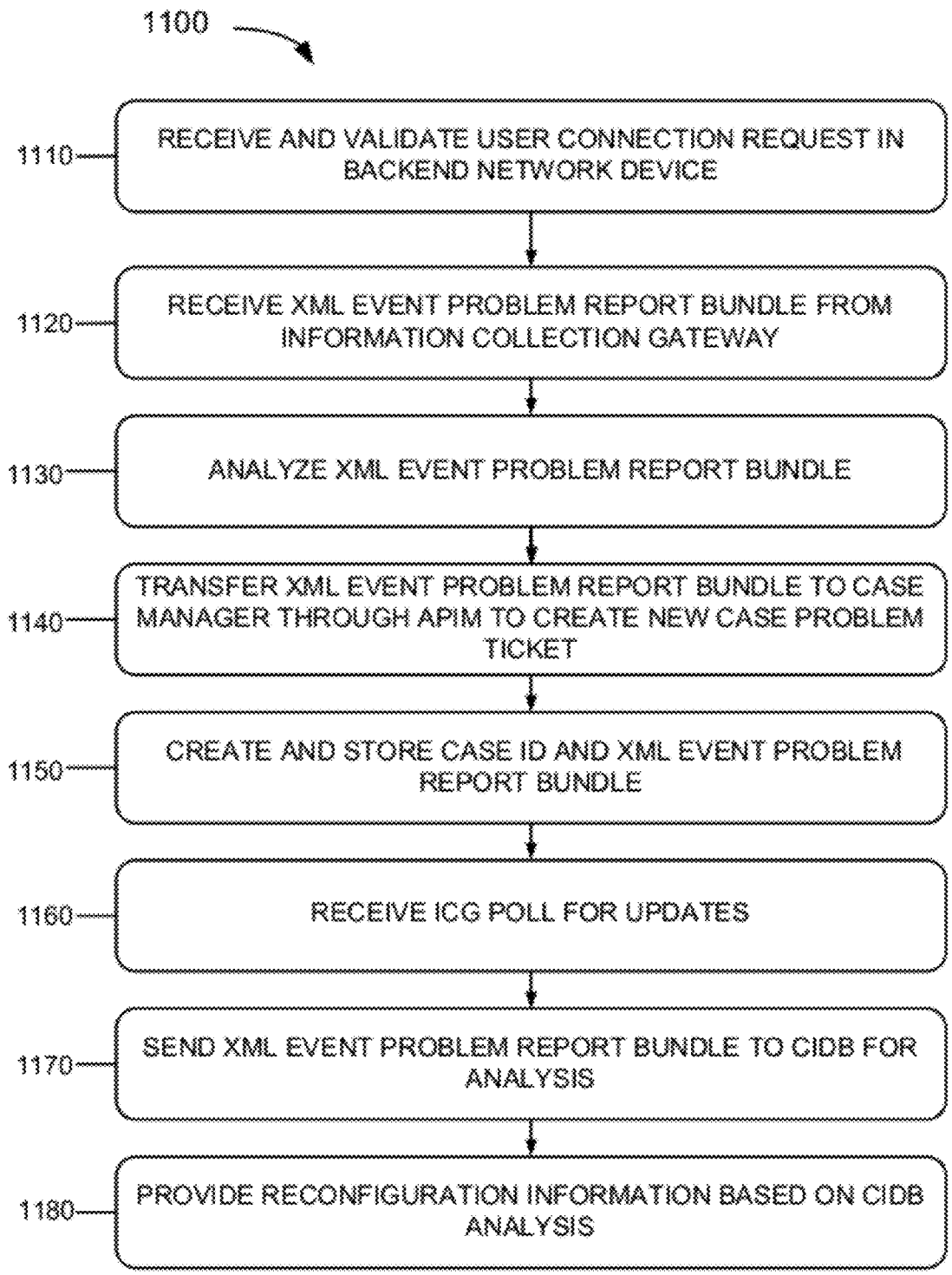

FIG. 11 is a flowchart illustrating an exemplary process 1100 for receiving and processing an XML event problem report bundle 460 in BND 150. Process 1100 may begin if BND 150 receives and validates a user connection request (block 1110). For example, ICG 140 may transmit an XML event problem report bundle 460 to BND 150, where information in the received XML event problem report bundle 460 may include user information that may identify a particular network or identify a particular ICG 140. Upon confirmation and validation of the user connection request, the XML event problem report bundle 460 transmitted from ICG 140 may be received by BND 150 (block 1120).

After receiving the XML event problem report bundle 460, the data may be analyzed (block 1130). For example, BND 150 may contain information gathered from previously received XML event problem report bundles 460 (from a number of different networks, such as networks 120-1 and 120-3) and may determine and associate a new software process or script based on the analyzed data. For example, upon analysis of the data within an XML event problem report bundle 460, BND 150 may determine that a software process contained in a network element 110 is more than one year old and a new updated software process may be obtained by ICG 140 via a backend network device poll 570.

After analyzing the data, the XML event problem report bundle 460 may be transmitted through the APIM 650 to case manager 630 to create a new case problem ticket (block 1140). Case manager 630 may create and store a case ID and store the received XML event problem report bundle 460 (block 1150). For example, case manager 630 may contain a customer relationship manager (CRM) tool that may directly map to and extract information contained in the XML header file in order to form a new case problem ticket. For example, information contained in tagged fields, such as for example, problem description, platform, time of problem, serial number, priority, severity of event, may be automatically extracted and a placed into a new case problem ticket. Further, using a CRM tool contained in case manager 630 allows for tagged fields to be specifically identified for each different customer. For example, one customer using network 120-1 (such as "company A") may be concerned with one type of tagged error field and a second customer using network 120-3 (such as "company B") may be concerned with one type of tagged device field. In this manner, case manger 630 may "customize" new case problem tickets for each different customer.

After creating a case ID and new case problem ticket, BND 150 may receive a poll from ICG (block 1160). For example, ICG 140-1 may periodically poll BND 150 for updated information relating to the created case ID. If BND 150 has determined a software solution or new script, this reconfiguration information may be obtained by ICG 140 during a backend network device poll 570.

BND may continue to process data received in an XML event problem report bundle by sending the XML event problem report bundle to CIDB 640 for analysis (block 1170). For example, the analysis performed by CIDB 640 may include any appropriate analysis algorithm such as, for example, a decision tree or an artificial intelligence database. The specific type of analysis performed by CIDB 640 may be determined by the type of network, error and/or data contained within XML event problem report bundle 460. CIDB 640 may contain algorithms to perform trend analysis, detect increments of critical counter values and measure or detect memory leaks, and may also create new software processes and/or scripts based on the collected and analyzed data. For example, if a trend is positively identified by CIDB 640, an additional script (reconfiguration information) may be created to reconfigure component(s) within network element 110 in order to adjust to the determined trend. In another example, if a specific software process is identified as potentially faulty by CIDB 640, a new script (reconfiguration information) may be created that contains new parameters to monitor within a network element 110.

In response to further ICG 140 polls, BND 150 may provide reconfiguration information to ICG 140 based on the analyzed data (block 1180). As described above, the reconfiguration information determined and produced by CIDB 640 may be obtained by ICG 140. Once obtained by ICG 140, network elements 110 may receive the appropriate reconfiguration information in order to correct (or proactively avoid) errors.

As BND 150 may receive XML event problem report bundles 460 from a plurality of network elements 110 within a plurality of different networks (such as networks 120-1 to 120-3), BND 150 may determine and proactively compensate for trends or tendencies within network elements 110 that may be undetectable by existing systems.

Therefore the exemplary systems and processes described above may provide an intelligent, descriptive, and/or flexible manner of reporting event data upstream through a number of network devices. Further, the systems and processes described may provide automatic analysis of errors and provide reconfiguration information that may be used to avoid errors in a network element 110 before they occur.

The foregoing description of implementations provides an illustration, but is not intended to be exhaustive or to limit the implementations to the precise form disclosed. Modifications and variations are possible in light of the above teachings or may be acquired from practice of the teachings.

In addition, while series of blocks have been described with regard to the processes illustrated in FIGS. 7-11, the order of the blocks may be modified in other implementations. Further, non-dependent blocks may represent blocks that can be performed in parallel. For example, blocks 1110-1180 that are performed for one received XML event problem report bundle 460 may be independent of blocks 1110-1180 for a second received XML event problem report bundle 460, and therefore, may be performed in parallel. Also, it may be possible to omit blocks within a process.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device comprising:
   a memory to store instructions; and
   a processor to execute the instructions to:
   receive a first problem report bundle from a first network device in a first network,
   the first problem report bundle including one or more problem reports that include data collected based on a script being initiated at the first network device,
   analyze data included in the first problem report bundle,
   determine one or more first scripts based on analyzing the data included in the first problem report bundle,
   receive a second problem report bundle from a second network device in a second network that is different from the first network,
   the second problem report bundle including one or more problem reports that include data collected based on a script being initiated at the second network device,
   analyze data included in the second problem report bundle,
   determine one or more second scripts based on analyzing the data included in the second problem report bundle,
   receive a poll from the first network device, the poll being associated with the first problem report bundle, and provide, based on receiving the poll, the one or more first scripts and the one or more second scripts to the first network device.

2. The network device of claim 1, where the processor further executes the instructions to:

identify, based on analyzing the data in the first problem report bundle and analyzing the data in the second problem report bundle, a trend associated with the first network device and the second network device, where the processor determines the one or more second scripts to address the identified trend.

3. The network device of claim 1, where, when analyzing the data included in the first problem report bundle, the processor further executes the instructions to:

determine that a component of the first network device is operating, and where, when analyzing the data included in the second problem report bundle, the processor further executes the instructions to:

identify one or more errors associated with operation of the component of the first network device, where the one or more second scripts are determined further based on the identified one or more errors.

4. The network device of claim 3, where the one or more second scripts associate a software process with the first network device to address the identified one or more errors.

5. The network device of claim 1, where, when analyzing the data included in the first problem report bundle, the processor further executes the instructions to:

examine a header file of the first problem report bundle, determine, based on examining the header file, whether the first problem report bundle is related to a particular type of error associated with operation of the first network device, store the first problem report bundle when the first problem report bundle is not related to the particular type of error, and analyze the first problem report bundle when the first problem report bundle is related to the particular type of error.

6. The network device of claim 5, where, when examining the header file, the processor further executes the instructions to:

determine that a particular field of the header file is tagged, identify a value included in the particular field based on the particular field being tagged, and determine whether the first problem report is related to the particular type of error based on the identified value.

7. The network device of claim 1, where the one or more second scripts update a software process of the first network device.

8. A non-transitory computer-readable medium storing instructions, the instructions comprising:

one or more instructions which, when executed by one or more processors, cause the one or more processors to:

receive first data from a first network device in a first network, the first data including data collected based on an initiation of a script at the first network device, analyze the data collected based on the initiation of the script at the first network device, determine one or more first scripts based on analyzing the data collected based on the initiation of the script at the first network device, receive second data from a second network device in a second network that is different from the first network, the second data including data collected based on an initiation of a script at the second network device, analyze the data collected based on the initiation of the script at the second network device, determine one or more second scripts based on analyzing the data collected based on the initiation of the script at the second network device, receive a poll from the first network device, the poll being associated with a transmission of the first data by the first network device, and provide, based on receiving the poll, the one or more first scripts and the one or more second scripts to the first network device.

9. The computer-readable medium of claim 8, where the instructions further comprise:

one or more instructions to identify, based on analyzing the data collected based on the initiation of the script at the first network device and analyzing the data collected based on the initiation of the script at the second network device, a trend associated with network devices included in the first network and the second network, and where the one or more instructions to determine the one or more second scripts include:

one or more instructions to determine the one or more second scripts based on the identified trend.

10. The computer-readable medium of claim 8, where the one or more instructions to analyze the data collected based on the initiation of the script at the first network device include:

one or more instructions to determine that a component of the first network device is currently operating, where the one or more instructions to analyze the data collected based on the initiation of the script at the second network device include:

one or more instructions to identify one or more errors associated with operation of the component of the first network device, and where the one or more instructions to determine the one or more second scripts include:

one or more instructions to determine the one or more second scripts to address the identified one or more errors.

11. The computer-readable medium of claim 10, where the one or more second scripts associate a software process with the first network device to address the identified one or more errors.

12. The computer-readable medium of claim 8, where the one or more instructions to analyze the data collected based on the initiation of the script at the first network device include:

one or more instructions to examine a header associated with the first data, one or more instructions to determine whether the first data is associated with a particular type of event based on examining the header, one or more instructions to store the first data when the first data is not associated with the particular type of event, and one or more instructions to analyze the data collected based on the initiation of the script at the first network device when the first data is associated with the particular type of event.

13. The computer-readable medium of claim 12, where the one or more instructions to examine the header include:

one or more instructions to determine that a particular field of the header is tagged, one or more instructions to identify a value included in the particular field based on the particular field being tagged, and one or more instructions to determine whether the first problem report is related to a particular type of error based on the identified value.

14. The computer-readable medium of claim 8, where the one or more second scripts update a software process of the first network device.

15. A method comprising:

receiving, by a network device, first data from a first network device in a first network, the first data including data collected based on an initiation of a script at the first network device;

analyzing, by the network device, the data collected based on the initiation of the script at the first network device;

determining, by the network device, one or more first scripts based on analyzing the data collected based on the initiation of the script at the first network device;

receiving, by the network device, second data from a second network device in a second network that is different from the first network, the second data including data collected based on an initiation of a script at the second network device;

analyzing, by the network device, the data collected based on the initiation of the script at the second network device;

determining, by the network device, one or more second scripts based on analyzing the data collected based on the initiation of the script at the second network device;

receiving, by the network device, a poll from the first network device, the poll being associated with a transmission of the first data by the first network device; and providing, by the network device, the one or more first scripts and the one or more second scripts to the first network device based on receiving the poll.

16. The method of claim 15, further comprising:

identifying, based on analyzing the data collected based on the initiation of the script at the first network device and analyzing the data collected based on the initiation of the script at the second network device, a trend associated with network devices included in the first network and the second network, and where the one or more second scripts are determined based on the identified trend.

17. The method of claim 15, where analyzing the data collected based on the initiation of the script at the first network device includes:

determining that a component of the first network device is currently operating;

where analyzing the data collected based on the initiation of the script at the second network device includes:

identifying one or more errors associated with operation of the component of the first network device; and where determining the one or more second scripts includes:

determining the one or more second scripts based on the identified one or more errors.

18. The method of claim 17, where the one or more second scripts are determined to associate a software process with the first network device, where associating the software process with the first network device corrects the identified one or more errors.

19. The method of claim 15, where analyzing the data collected based on the initiation of the script at the first network device includes:

examining a header associated with the first data, determining whether the first data is associated with a particular type of event or a particular type of error based on examining the header, storing, when the first data is not associated with the particular type of event or the particular type of error, the first data, where the first data is stored without being analyzed, and analyzing the data collected based on the initiation of the script at the first network device when the first data is associated with the particular type of event or the particular type of error.

20. The method of claim 19, where examining the header includes:

determining that a particular field of the header is tagged, identifying a value included in the particular field based on the particular field being tagged, and determining whether the first problem report is related to the particular type of error based on the identified value.

* * * * *